US011551319B2

(12) United States Patent
Yang

(10) Patent No.: US 11,551,319 B2
(45) Date of Patent: Jan. 10, 2023

(54) METHOD AND APPARATUS FOR DETERMINING EVIDENCE AUTHENTICITY BASED ON BLOCKCHAIN LEDGER

(71) Applicant: ADVANCED NEW TECHNOLOGIES CO., LTD., George Town (KY)

(72) Inventor: Xinying Yang, Hangzhou (CN)

(73) Assignee: Advanced New Technologies Co., Ltd.

( * ) Notice: Subject to any disclaimer, the term of this patent is extended or adjusted under 35 U.S.C. 154(b) by 0 days.

(21) Appl. No.: 16/938,760

(22) Filed: Jul. 24, 2020

(65) Prior Publication Data
US 2020/0357086 A1   Nov. 12, 2020

Related U.S. Application Data

(63) Continuation of application No. PCT/CN2019/089000, filed on May 29, 2019.

(30) Foreign Application Priority Data

Aug. 21, 2018  (CN) .......................... 201810955485.8

(51) Int. Cl.
*G06Q 50/18*  (2012.01)
*G06F 16/27*  (2019.01)
(Continued)

(52) U.S. Cl.
CPC .......... *G06Q 50/18* (2013.01); *G06F 16/2379* (2019.01); *G06F 16/245* (2019.01); *G06F 16/27* (2019.01); *G06F 16/285* (2019.01)

(58) Field of Classification Search
USPC ........................................................ 705/311
See application file for complete search history.

(56) References Cited

U.S. PATENT DOCUMENTS

2007/0282824 A1 * 12/2007 Ellingsworth ........ G06F 16/353
2007/0283158 A1 * 12/2007 Danseglio ........ G11B 20/00086
                                                            713/180
(Continued)

FOREIGN PATENT DOCUMENTS

CN        105975868 A       9/2016
CN        106204287 A      12/2016
(Continued)

OTHER PUBLICATIONS

David Billard. Weighted Forensics Evidence Using Blockchain. In Proceedings of the 2018 International Conference on Computing and Data Engineering (ICCDE 2018), Association for Computing Machinery, New York, NY, USA, 57-61. https://doi.org/10.1145/3219788.3219792 (Year: 2018).*
(Continued)

*Primary Examiner* — Michael Young
(74) *Attorney, Agent, or Firm* — Seed IP Law Group LLP

(57) ABSTRACT

Disclosed are a method and apparatus for determining evidence authenticity based on a blockchain ledger. The method includes: identifying target electronic evidence, providing a relatively high authenticity reference score for the target electronic evidence in response to that it is determined that the target electronic evidence is stored by at least one candidate blockchain ledger platform, and providing a relatively low authenticity reference score for the target electronic evidence in response to that it is determined that the target electronic evidence is not stored by at least one candidate blockchain ledger platform. If the target electronic evidence corresponds to a relatively high authenticity reference score, it indicates that the identified target electronic evidence has a relatively high degree of authenticity (possibility of being authentic) and a relatively low possibility of being tampered with.

20 Claims, 4 Drawing Sheets

(51) Int. Cl.
   *G06F 16/23*   (2019.01)
   *G06F 16/245*  (2019.01)
   *G06F 16/28*   (2019.01)

(56) References Cited

U.S. PATENT DOCUMENTS

| | | | | |
|---|---|---|---|---|
| 2014/0143545 | A1* | 5/2014 | McKeeman | H04L 63/0853 |
| | | | | 713/168 |
| 2015/0332283 | A1 | 11/2015 | Witchey | |
| 2016/0283920 | A1* | 9/2016 | Fisher | H04L 9/3297 |
| 2018/0082290 | A1 | 3/2018 | Allen et al. | |
| 2018/0197173 | A1 | 7/2018 | Durvasula et al. | |
| 2019/0287118 | A1* | 9/2019 | Ross | G06F 16/5838 |
| 2019/0287199 | A1* | 9/2019 | Messerges | G06F 16/27 |

FOREIGN PATENT DOCUMENTS

| | | | | |
|---|---|---|---|---|
| CN | 106357612 | A | 1/2017 | |
| CN | 106877998 | A | 6/2017 | |
| CN | 107819777 | A | 3/2018 | |
| CN | 107888375 | A | 4/2018 | |
| CN | 107967416 | A | 4/2018 | |
| CN | 108011945 | A | 5/2018 | |
| CN | 108154400 | A | 6/2018 | |
| CN | 207504911 | U | 6/2018 | |
| CN | 109255628 | A | 1/2019 | |
| CN | 109345061 | A | 2/2019 | |
| EP | 3208744 | A1 * | 8/2017 | ............ G06F 16/51 |
| JP | 6340107 | B1 | 6/2018 | |
| TW | 201351316 | A | 12/2013 | |
| TW | M555500 | U | 2/2018 | |
| TW | I629658 | B | 7/2018 | |
| WO | 2018/120129 | A1 | 7/2018 | |

OTHER PUBLICATIONS

Billard, "Weighted Forensics Evidence Using Blockchain," *ICCDE 2018: Proceedings of the 2018 International Conference on Computing and Data Engineering*: pp. 57-61, May 2018.

* cited by examiner

METHOD AND APPARATUS FOR DETERMINING EVIDENCE AUTHENTICITY BASED ON BLOCKCHAIN LEDGER

BACKGROUND

Technical Field

Implementations of the present specification relate to the field of information technology, and more particularly, to a method and apparatus for determining evidence authenticity based on a blockchain ledger.

Description of the Related Art

At present, it is not easy for a judicial official (such as a judge or a prosecutor) to examine whether electronic evidence (which can be evidence generated in an electronic form or can be an electronic form of physical evidence) submitted by a case-related person is authentic and has not been tampered with. In some cases, a judicial official mistakenly identifies electronic evidence that has been tampered with as authentic electronic evidence.

In view of this, there is a need for a method for determining evidence authenticity to reduce the difficulty of a judicial official in examining the authenticity of electronic evidence.

BRIEF SUMMARY

To solve the problem that it is difficult for a judicial official to examine the authenticity of electronic evidence, implementations of the present specification provide a method and apparatus for determining evidence authenticity based on a blockchain ledger. The technical solution is as follows.

According to a first aspect of the implementations of the present specification, a method for determining evidence authenticity based on a blockchain ledger is provided, including: determining whether target electronic evidence is stored by at least one candidate blockchain ledger platform; determining a first score as an authenticity reference score corresponding to the target electronic evidence in response to that it is determined that the target electronic evidence is stored by the at least one candidate blockchain ledger platform; and determining a second score as the authenticity reference score corresponding to the target electronic evidence in response to it is determined that the target electronic evidence is not stored by the at least one candidate blockchain ledger platform; where the authenticity reference score corresponding to the target electronic evidence is positively related to an identified authenticity degree of the target electronic evidence, and the first score is greater than the second score.

According to a second aspect of the implementations of the present specification, an apparatus for determining evidence authenticity based on a blockchain ledger is provided, including: a determining module, configured to determine whether target electronic evidence is stored by at least one candidate blockchain ledger platform; a first processing module, configured to: determine a first score as an authenticity reference score corresponding to the target electronic evidence in response to that the determining module determines that the target electronic evidence is stored by the at least one candidate blockchain ledger platform; and a second processing module, configured to determine a second score as the authenticity reference score corresponding to the target electronic evidence in response to that the determining module determines that the target electronic evidence is not stored by the at least one candidate blockchain ledger platform; where the authenticity reference score corresponding to the target electronic evidence is positively related to an identified authenticity degree of the target electronic evidence, and the first score is greater than the second score.

According to the technical solution provided in the implementations of the present specification, target electronic evidence is identified, a relatively high authenticity reference score for the target electronic evidence is provided in response to that it is determined that the target electronic evidence is stored by at least one candidate blockchain ledger platform, and a relatively low authenticity reference score for the target electronic evidence is provided in response to that it is determined that the target electronic evidence is not stored by at least one candidate blockchain ledger platform. If the target electronic evidence corresponds to a relatively high authenticity reference score, it indicates that the identified target electronic evidence has a relatively high degree of authenticity, e.g., possibility of being authentic, and a relatively low possibility of being tampered with. The electronic evidence that has been stored by the blockchain ledger platform often has a tamper-resistance characteristic, and the authenticity reference score corresponding to the electronic evidence is made based on whether the electronic evidence has been stored by the blockchain ledger platform. As such, the authenticity reference score corresponding to the electronic evidence is used as a reference, so the difficulty of the judicial official in examining the authenticity of the electronic evidence can be significantly reduced.

It should be understood that the general descriptions above and the detailed descriptions below are merely examples and illustrative, and cannot limit the implementations of the present specification.

In addition, any one of the implementations of the present specification does not need to achieve all the effects above.

BRIEF DESCRIPTION OF THE SEVERAL VIEWS OF THE DRAWINGS

To describe the technical solutions in the implementations of the present specification or in the existing technologies more clearly, the following briefly describes the accompanying drawings needed for describing the implementations or the existing technologies. Clearly, the accompanying drawings in the following descriptions merely show some implementations of the present specification, and a person of ordinary skill in the art can still derive other drawings from these accompanying drawings.

DETAILED DESCRIPTION

To make a person skilled in the art better understand the technical solutions in the implementations of the present specification, the following describes in detail the technical solutions in the implementations of the present specification with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope of the present specification.

The following describes in detail the implementations of the present specification.

Figure 1:
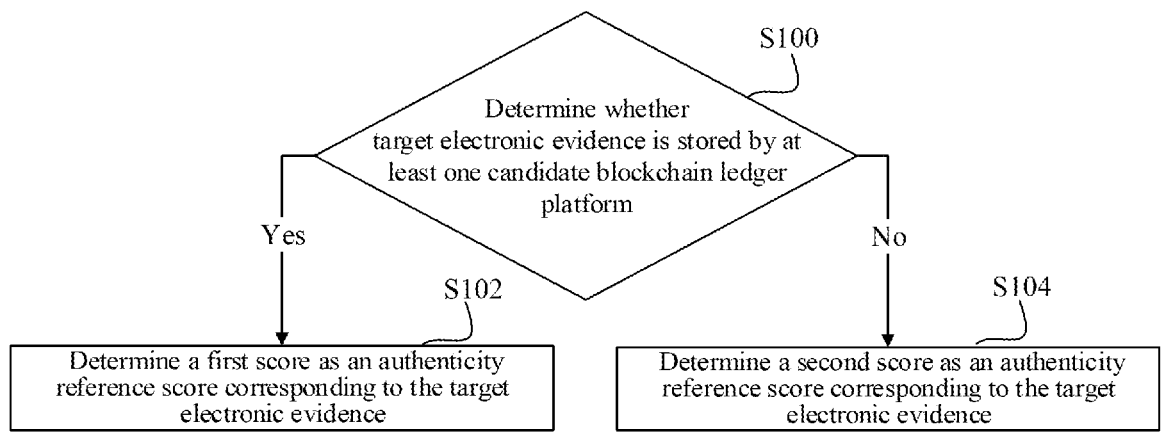
FIG. 1 is a schematic flowchart illustrating a method for determining evidence authenticity based on a blockchain ledger according to an implementation of the present specification.

FIG. 1 is a schematic flowchart illustrating a method for identifying evidence authenticity based on a blockchain ledger according to implementations of the present specification, and the method includes the following steps.

S100: Determine whether target electronic evidence has been stored by at least one candidate blockchain ledger platform; perform step S102 in response to that it is determined that the target electronic evidence has been stored by the at least one candidate blockchain ledger platform; or perform step S104 in response to that it is determined that the target electronic evidence is not stored by the at least one candidate blockchain ledger platform.

The method can be executed by a device, referred to as an identification device herein for descriptive purposes, managed by an entity, such as a court, that requires identification of the authenticity of electronic evidence. More specifically, in practice, the identification device can be an online case acceptance system of a court, and the online case acceptance system accepts a case online, identifies the authenticity of electronic evidence related to the case, and provides an identification result, e.g., an authenticity reference score corresponding to the electronic evidence, to a judge for reference.

It should be noted that the electronic evidence described herein can be evidence generated electronically, e.g., a web page, or can be an electronic form of physical evidence, e.g., a photograph of a signed document acknowledging a debt "an IOU". It should also be noted that the target electronic evidence refers to electronic evidence to be authenticated, which can be evidence presented by a person on the side of a party who initiates a lawsuit case against another person, referred to as "the accusant" for descriptive purposes, or can be evidence presented by a person on the side of a party who is accused in the lawsuit, referred to as "the respondent" for descriptive purposes, or can be electronic evidence presented by other relevant persons of the case, such as investigators or a person of interest of the case.

In the implementations of the present specification, the blockchain ledger platform is a service mechanism for storing data uploaded by a user based on the blockchain technology. The user can use the blockchain ledger platform to store electronic evidence that needs to be preserved.

Generally, the blockchain ledger platform stores the electronic evidence by using a data structure of a transaction in a blockchain network.

It should be noted that the transaction described in the present specification refers to a piece of data that is created by a user by using a blockchain client and that needs to be finally added to a distributed database of the blockchain. That is, transactions in the blockchain include a transaction in a narrow sense and a transaction in a broad sense. A transaction in a narrow sense refers to a value transfer added by a user to the blockchain. For example, in a conventional Bitcoin blockchain network, a transaction can be a transfer initiated by a user in the blockchain. A transaction in a broad sense refers to service data that is added by a user to the blockchain and that has a service intention. For example, an operator can establish a consortium blockchain based on actual service needs, and deploy some other types of online services, for example, a rental service, a vehicle scheduling service, an insurance claim service, a credit service, and a medical service, that are not related to value transfer in the consortium blockchain. In such consortium blockchain, a transaction can be a service message or a service request that is added by a user to the consortium blockchain and that has a service intention.

Specifically, the blockchain ledger platform can serve as a node in the blockchain network. When receiving the electronic evidence uploaded by the user, the blockchain ledger platform can construct a transaction containing an evidence hash of the electronic evidence, certainly, can also include the electronic evidence itself, and broadcast the constructed transaction to the blockchain network, so each node subsequently stores the transaction into its own blockchain based on a consensus mechanism, thereby realizing multi-party evidence storage of the electronic evidence. Herein, when the transaction contains only the evidence hash of the electronic evidence, because the evidence hash of the electronic evidence has been published to the blockchain network and added to the copy of the blockchain stored in other nodes of the blockchain network, if the electronic evidence is tampered with, e.g., in one or more of the nodes, the evidence hash of the tampered electronic evidence will be inconsistent with the published evidence hash and the evidence hash added in another copy of the blockchain stored at another node of the blockchain network. Therefore, adding the evidence hash of the electronic evidence to the blockchain is equivalent to storing the electronic evidence by multiple parties. It should also be noted that when the transaction contains only the evidence hash of the electronic evidence, the blockchain ledger platform typically stores the electronic evidence separately in a data warehouse, e.g., non-blockchain.

In addition, the blockchain ledger platform can also provide an electronic evidence storage service for a user based on other possible blockchain network architecture, e.g., the Factom architecture.

In the implementations of the present specification, several blockchain ledger platforms in the market can be specified as candidate blockchain ledger platforms. For example, the courts can select a plurality of blockchain ledger platforms as the candidate blockchain ledger platforms from the blockchain ledger platforms in the market, and establish a cooperation relationship with each candidate blockchain ledger platform. The online case acceptance system of the court can be interconnected with the server(s) of each candidate blockchain ledger platform.

In the implementations of the present specification, the identification device determines, in at least four methods, whether the target electronic evidence has been stored by at least one candidate blockchain ledger platform.

1. Obtain target electronic evidence uploaded by a user; query a candidate blockchain ledger platform to determine whether a transaction stored by the candidate blockchain ledger platform includes the target electronic evidence; in response to that the transaction stored by the candidate blockchain ledger platform includes the target electronic evidence, determine that the target electronic evidence has been stored by the candidate blockchain ledger platform; and in response to that the transaction stored by the candidate blockchain ledger platform does not include the target electronic evidence, determine that the target electronic evidence is not stored by the candidate blockchain ledger platform. The user who uploads the target electronic evidence can be the accusant, the respondent, or another related person of a case.

2. Obtain target electronic evidence uploaded by a user; calculate an evidence hash of the target electronic evidence based on the target electronic evidence; query a candidate blockchain ledger platform based on the evidence hash to determine whether the evidence hash is included in a transaction stored by the candidate blockchain ledger platform; in response to that the evidence hash is included in the transaction stored by the candidate blockchain ledger platform, determine that the target electronic evidence has been stored by the candidate blockchain ledger platform; and in response to that the evidence hash is not included in the transaction stored by the candidate blockchain ledger platform, determine that the target electronic evidence is not stored by the candidate blockchain ledger platform. The user who uploads the target electronic evidence can be the accusant, the respondent, or another related person of a case.

In methods 1 and 2, the user needs to upload the target electronic evidence to the identification device. If the target electronic evidence is indirectly stored in the form of an evidence hash, the identification device can calculate the evidence hash of the electronic evidence and verify the target electronic evidence through each candidate blockchain ledger platform by using the calculated evidence hash as a clue, so as to determine whether the target electronic evidence is actually stored by at least one candidate blockchain ledger platform. If the target electronic evidence is directly stored, e.g., in the original form and not as a hash or in addition to being stored as a hash, the identification device can directly verify through each candidate blockchain ledger platform whether the target electronic evidence has been added to the blockchain.

3. Obtain a target transaction hash uploaded by a user; query a candidate blockchain ledger platform based on the target transaction hash to determine whether there is a transaction whose transaction hash is the target transaction hash among transactions recorded by the candidate blockchain ledger platform; in response to that there is a transaction whose transaction hash is the target transaction hash among the transactions recorded by the candidate blockchain ledger platform, identify the transaction whose transaction hash is the target transaction hash as a target transaction, determine electronic evidence stored by the target transaction as the target electronic evidence, and determine that the target electronic evidence has been stored by the candidate blockchain ledger platform; and in response to that there is no transaction whose transaction hash is the target transaction hash among the transactions recorded by the candidate blockchain ledger platform, determine that the target electronic evidence is not stored by the candidate blockchain ledger platform.

The user who uploads the target transaction hash can be the accusant, the respondent, or another related person of a case. The target transaction hash is a transaction hash of the target transaction, and the target transaction is a transaction containing the evidence hash of the target electronic evidence.

In method 3, the user uploads the target transaction hash to the identification device without needing to upload the target electronic evidence. Based on the target transaction hash, the identification device queries the target transaction corresponding to the target transaction hash through each candidate blockchain ledger platform. If the target transaction cannot be found, the identification device determines that the target transaction hash is invalid, which further indicates that the target electronic evidence is not stored by at least one candidate blockchain ledger platform. If the target transaction is found, the electronic evidence stored by using the target transaction is the target electronic evidence.

Further, if the target electronic evidence itself is included in the target transaction stored in the blockchain, the target electronic evidence can be extracted directly from the target transaction; if the target transaction stored in the blockchain contains the evidence hash of the target electronic evidence, the evidence hash can be used as a clue to extract the target electronic evidence from another route, e.g., a data warehouse.

4. Obtain the target electronic evidence and a target transaction hash uploaded by a user; query a candidate blockchain ledger platform based on the target transaction hash to determine whether there is a transaction whose transaction hash is the target transaction hash among transactions recorded by the candidate blockchain ledger platform; in response to that there is a transaction whose transaction hash is the target transaction hash among the transactions recorded by the candidate blockchain ledger platform, identify the transaction whose transaction hash is the target transaction hash as a target transaction, determine whether electronic evidence stored by the target transaction is the same as the target electronic evidence, in response to that the electronic evidence stored by the target transaction is the same as the target electronic evidence, determine that the target electronic evidence has been stored by the candidate blockchain ledger platform, and in response to that the electronic evidence stored by the target transaction is not the same as the target electronic evidence, determine that the target electronic evidence is not stored by the candidate blockchain ledger platform; and in response to that there is no transaction whose transaction hash is the target transaction hash among the transactions recorded by the candidate blockchain ledger platform, determine that the target electronic evidence is not stored by the candidate blockchain ledger platform.

In method 4, the user can upload the target electronic evidence and the target transaction hash to the identification device. Herein, as previously described, the target electronic evidence is added to the blockchain in the data structure of the target transaction, which can contain the electronic evidence itself or can contain only the evidence hash of the target electronic evidence. Based on this, in method 4, it is determined whether the electronic evidence stored by using the target transaction is the same as the target electronic evidence. Specifically, the evidence hash of the electronic evidence stored by using the target transaction can be calculated, the evidence hash of the target electronic evidence can be calculated, and the calculated two evidence hashes are compared to determine whether they are consistent. If they are consistent, it can be determined that the target electronic evidence has been stored by the candidate blockchain ledger platform.

In summary, in step S100, the identification device can determine, in a plurality of ways, whether the target electronic evidence has been stored by at least one candidate blockchain ledger platform, and thereby identify the authenticity degree, e.g., the possibility of being authentic, of the target electronic evidence.

If the target electronic evidence is not stored by any candidate blockchain ledger platform, it means that the authenticity degree of the target electronic evidence is unknown, and the target electronic evidence may have been tampered with. If the target electronic evidence has been stored by at least one candidate blockchain ledger platform, it means that the authenticity degree of the target electronic evidence is high and the possibility of being tampered with is low.

S102: Determine a first score as an authenticity reference score corresponding to the target electronic evidence.

S104: Determine a second score as an authenticity reference score corresponding to the target electronic evidence.

In the implementations of the present specification, the concept of the authenticity reference score is introduced to quantify the authenticity degree of the electronic evidence. The higher the authenticity degree of the target electronic evidence identified by the identification device, the higher the authenticity reference score given for the target electronic evidence. Specifically, the authenticity reference score can range from 0 to 100 scores. Assume that the authenticity reference score corresponding to the target electronic evidence is 90, it means that the probability that the identification device considers that the target electronic evidence is authentic and is not tampered with is 90%.

A relatively high authenticity reference score, e.g., the first score, is assigned to the target electronic evidence if the target electronic evidence is stored by at least one candidate blockchain ledger platform; and a relatively low authenticity reference score, e.g., that is, the second score, is assigned to the target electronic evidence if the target electronic evidence is not stored by any candidate blockchain ledger platform. That is, the first score is greater than the second score.

According to the method shown in FIG. 1, if the target electronic evidence corresponds to a relatively high authenticity reference score, it indicates that the identified target electronic evidence has a relatively high degree of authenticity, e.g., possibility of being authentic, and a relatively low possibility of being tampered with. The electronic evidence that has been stored by the blockchain ledger platform often has a tamper-resistance characteristic, and the authenticity reference score corresponding to the electronic evidence is made based on whether the electronic evidence has been stored by the blockchain ledger platform. As such, the authenticity reference score corresponding to the electronic evidence is used as a reference, so the difficulty of the judicial official in examining the authenticity of the electronic evidence can be significantly reduced.

In addition, in the implementations of the present specification, a plurality of categories can be determined, e.g., predetermined or dynamically determined, and a corresponding scoring rule can be configured for each category of the plurality of categories. Based on the types of legal cases involved in the electronic evidence, corresponding categories can be configured, for example: category 1. network copyright cases—right of distribution; category 2. criminal cases—fraud; category 3. contract dispute cases—breach of contract.

The categories can also be configured based on different types of evidence, for example: category 1. audiovisual evidence—webpage screenshots; category 2. text evidence—Word documents.

Categories can also be configured based on the types of cases involved in the electronic evidence and the types of evidence, for example: category 1. (network copyright cases—right of distribution, audiovisual evidence—webpage screenshots); category 2. (criminal cases—fraud, text evidence—Word documents).

Therefore, in step S102, the category of the target electronic evidence can be determined as a target category; and the first score can be determined based on a scoring rule corresponding to the target category. In step S104, the category of the target electronic evidence can be determined as a target category; and the second score can be determined based on a scoring rule corresponding to the target category.

The scoring rules for different categories are different, which means that if the same electronic evidence belongs to different categories, the resulting authenticity reference scores can be different. For example, there are categories: 1. network copyright cases—right of distribution; 2. criminal cases—fraud. The scoring rule corresponding to category 1 may be not strict, but the scoring rule corresponding to category 2 may be strict. Assume that the target electronic evidence is a recording and has been stored on a certain candidate blockchain ledger platform. If the recording is classified into category 1, the authenticity reference score obtained for the recording can be 99 scores. If the recording is classified into category 2, the authenticity reference score obtained for the recording can be 80 scores.

Further, a plurality of score intervals corresponding to each category of the plurality of categories can be determined, and an authenticity reference level corresponding to each score interval corresponding to the category can be configured. Between two score intervals of the plurality of score intervals, a score interval with a larger left endpoint value (or right endpoint value) corresponds to a higher authenticity reference level. That is, the authenticity reference level corresponding to the score interval with a larger left endpoint value is higher than that corresponding to a score interval with a smaller left endpoint value. Generally, all score intervals do not overlap. For example, assume that the authenticity reference score ranges from 0 to 100 scores, for a certain category, [0, 100] can be divided into several score intervals, e.g., [0, 40), [40, 80), and [80, 100], as score intervals corresponding to the category. Then, for each score interval corresponding to the category, a corresponding authenticity reference level is configured. For example, [0, 40) corresponds to an authenticity level 1, [40, 80) corresponds to an authenticity level 2, and [80, 100] corresponds to an authenticity level 3.

Based on this, after the authenticity reference score corresponding to the target electronic evidence is obtained, the evidence category to which the target electronic evidence belongs can be determined as a target evidence category. Then, in score intervals corresponding to the target category, a score interval into which the authenticity reference score corresponding to the target electronic evidence falls is determined as a target score interval. An authenticity reference level corresponding to the target score interval is determined as the authenticity reference level corresponding to the target electronic evidence.

Still further, in the implementations of the present specification, one or more of a scoring rule and a score interval corresponding to a certain category can be adjusted based on the final determination of the authenticity of the electronic evidence in the judicial procedure.

Specifically, an authenticity confidence level corresponding to each electronic evidence belonging to each category is obtained, and the authenticity confidence level corresponding to the electronic evidence is confirmed by the judicial procedure. Electronic evidence whose authenticity reference level and authenticity confidence level are inconsistent is selected as specified electronic evidence from the electronic evidence belonging to the category. In response to that a ratio between the specified electronic evidence and the electronic evidence belonging to the category is greater than a threshold ratio, one or more of a scoring rule and a score interval corresponding to the category are adjusted based on the authenticity confidence level corresponding to each specified electronic evidence, the authenticity reference level corresponding to each specified electronic evidence that is obtained based on the adjusted one or more of the scoring rule and the score interval corresponding to the category being consistent with the authenticity confidence level corresponding to the specified electronic evidence.

For example, after the online case acceptance system runs for a period of time, the authenticity of 100 pieces of electronic evidence belonging to category 1 is successively identified, and authenticity reference levels corresponding to the 100 pieces of electronic evidence are obtained. After the 100 pieces of electronic evidence are successively submitted to the court, the court determines, through the judicial procedure, authenticity confidence levels corresponding to the 100 pieces of electronic evidence. There are 25 pieces of electronic evidence, referred to as specified electronic evidence for descriptive purposes, whose authenticity reference levels are inconsistent with their authenticity confidence levels. The ratio is 25% and is greater than 20%, e.g., an example threshold ratio. Then, the online case acceptance system can adjust the one or more of the scoring rule and the score interval corresponding to category 1 accordingly, so the authenticity reference level corresponding to each specified electronic evidence that is obtained based on the adjusted one or more of the scoring rule and the score interval is consistent with the authenticity confidence level corresponding to the specified electronic evidence.

In addition, in the implementations of the present specification, in response to that it is determined that the target electronic evidence is not stored by any candidate blockchain ledger platform, whether the target electronic evidence is stored by a non-candidate blockchain ledger platform specified by a user can be further determined. In response to that the target electronic evidence is stored by the non-candidate blockchain ledger platform specified by the user, a third score corresponding to the target electronic evidence is determined as the authenticity reference score corresponding to the target electronic evidence. In response to that the target electronic evidence is not stored by the non-candidate blockchain ledger platform specified by the user, a second score corresponding to the target electronic evidence is determined as the authenticity reference score corresponding to the target electronic evidence. The third score is greater than the second score, and the third score is less than the first score.

That is, if the target electronic evidence is not stored by any candidate blockchain ledger platform, but is stored by a non-candidate blockchain ledger platform, e.g., not connected to the identification device in advance, the authenticity of the target electronic evidence can be supported to some extent.

Further, in step S104, the specified score can be determined as the second score, and in response to determining that a specified condition is met, a score greater than the specified score can be determined as the second score.

The determining that the specified condition is met specifically includes: determining, as similar electronic evidence corresponding to the target electronic evidence, the electronic evidence most similar to the target electronic evidence from electronic evidence stored by each candidate blockchain ledger platform; calculating a similarity score between the target electronic evidence and the similar electronic evidence as a similarity score corresponding to the target electronic evidence, a greater similarity score corresponding to the target electronic evidence indicating that the target electronic evidence is more similar to the similar electronic evidence; selecting a similarity score that is greatest among similarity scores corresponding to the target electronic evidence as a greatest similarity score; and in response to that the greatest similarity score is greater than a threshold similarity score, determining that the specified condition is met.

It should be noted herein that, in practice, sometimes the version of the electronic evidence uploaded by the user to the blockchain ledger platform is the original version, referred to as the original electronic evidence. Then, the user provides the latest version, e.g., the latest electronic evidence, of the electronic evidence to the identification device. The original electronic evidence is often similar to the latest electronic evidence, but with a certain difference, which may cause the identification device to determine that the latest electronic evidence is not stored by any candidate blockchain ledger platform in verifying the authenticity of the latest electronic evidence. To avoid this scenario, if the target electronic evidence is not stored by any blockchain ledger platform, but is similar to a certain electronic evidence that has been stored, the authenticity reference score corresponding to the target electronic evidence can be determined as a higher score, but should be smaller than the first score.

Figure 2:
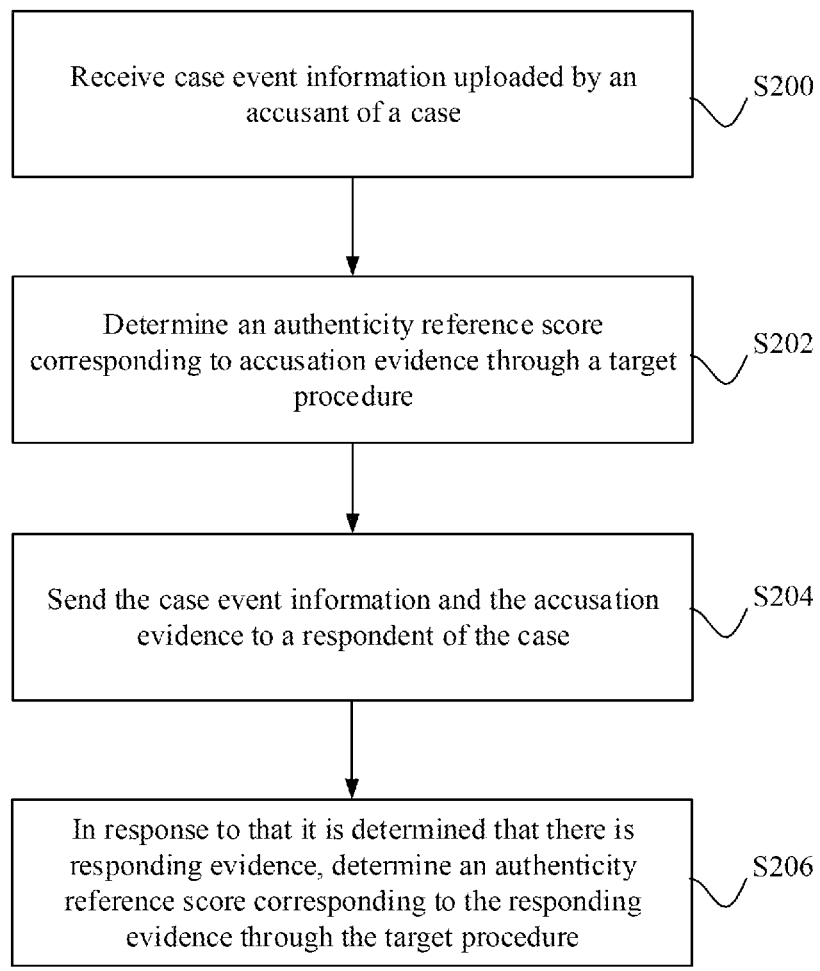
FIG. 2 is a schematic flowchart illustrating a method for determining authenticity of two parties' evidence based on a blockchain ledger according to an implementation of the present specification.

FIG. 2 shows a method for identifying two parties' evidence based on a blockchain ledger according to implementations of the present specification, and the method includes the following steps.

S200: Receive case event information uploaded by an accusant of a case.

S202: Determine an authenticity reference score corresponding to evidence of the accusant ("accusation evidence") through a target procedure.

S204: Send the case event information and the accusation evidence to a respondent of the case.

S206: In response to that it is determined that there is evidence provided by the respondent ("responding evidence"), determine an authenticity reference score corresponding to the responding evidence through the target procedure.

The method can be executed by the identification device described above, or can be specifically performed by the online case acceptance system described above.

As is well known, in the judicial field, evidence is generally presented in respect of a case event and is used for supporting or falsifying the occurrence of the case event.

In the implementations of the present specification, the accusant can be a plaintiff in a civil case, a prosecutor in a criminal case, the victim, or a relative of the victim or other parties who initiate an allegation of case event information. The respondent can be a defendant in a civil case, a criminal suspect in a criminal case, or a relative of the criminal suspect, or other parties who respond to the alleged case event information initiated by an accusant. The description here uses accusant and respondent as illustrative examples to facilitate the description. It should be appreciated that the scope of the disclosure is not limited by the categorization of parties as accusants or respondents. In some scenarios or some legal actions, the division between an accusant and a respondent may not be very clear. For example, a defendant in a civil case may also initiated an allegation of case event information and may be categorized as an accusant for the case event information the defendant initiated. As such, the description here may also use a first part and a second party to refer to different parties in a legal action. The electronic evidence presented by the first party and the second party is referred to as first party evidence and second party evidence, respectively.

In the method shown in FIG. 2, the accusation evidence is electronic evidence presented by the accusant for supporting the case event information, and the responding evidence is electronic evidence presented by the respondent for falsifying the case event information.

In the method shown in FIG. 2, the target procedure is actually the method flow shown in FIG. 1. For the description of the target procedure, refer to the above description, and details are omitted herein for simplicity.

In the method shown in FIG. 2, for a certain case event that the accusant of the case claims to be real, the accusant's accusation evidence for supporting the case event is identified through the target procedure; in addition, the respondent's responding evidence for falsifying the case event is identified through the target procedure. The target procedure is: identifying target electronic evidence (accusation evidence or responding evidence), providing a relatively high authenticity reference score for the target electronic evidence when it is determined that the target electronic evidence has been stored by at least one candidate blockchain ledger platform, and providing a relatively low authenticity reference score for the target electronic evidence when it is determined that the target electronic evidence is not stored by the at least one candidate blockchain ledger platform. If the target electronic evidence corresponds to a relatively high authenticity reference score, it indicates that the identified target electronic evidence has a relatively high degree of authenticity, e.g., possibility of being authentic, and a relatively low possibility of being tampered with. The electronic evidence that has been stored by the blockchain ledger platform often has a tamper-resistance characteristic, and the authenticity reference score corresponding to the electronic evidence is made based on whether the electronic evidence has been stored by the blockchain ledger platform. As such, the authenticity reference score corresponding to the electronic evidence is used as a reference, so the difficulty of the judicial official in examining the authenticity of the electronic evidence can be significantly reduced.

In the method shown in FIG. 2, the authenticity reference score corresponding to the accusation evidence can be corrected based on the presence or absence of the responding evidence and the authenticity reference score corresponding to the responding evidence.

Specifically, in response to that it is determined that there is no responding evidence, the authenticity reference score corresponding to the accusation evidence can be increased. Certainly, when the authenticity reference score corresponding to the accusation evidence is already the full score, it is in fact impossible to continue to increase the score. Therefore, in practice, in response to that it is determined that there is no responding evidence, and the authenticity reference score corresponding to the accusation evidence does not reach the full score, the authenticity reference score corresponding to the accusation evidence is increased.

It should be noted that if the respondent does not provide the electronic evidence for falsifying the case event information, it means that the respondent is likely to tacitly admit that the case event information is true. In this case, increasing the authenticity reference score corresponding to the accusation evidence can further reduce the difficulty of the judicial official in examining the authenticity of the electronic evidence.

Further, in response to that it is determined that there is responding evidence, it can be determined whether the authenticity reference score corresponding to the responding evidence meets a determined correction triggering condition, and in response to that the authenticity reference score corresponding to the responding evidence meets the determined correction triggering condition, the authenticity reference score corresponding to the accusation evidence is corrected.

Further, in response to that the authenticity reference score corresponding to the responding evidence is greater than a first specified threshold score, as the determined correction triggering condition, the authenticity reference score corresponding to the accusation evidence can be decreased. In response to that the authenticity reference score corresponding to the responding evidence is less than a second specified threshold score, as the determined correction triggering condition, the authenticity reference score corresponding to the accusation evidence can be increased. The first specified threshold score is greater than the second specified threshold score.

That is, when the authenticity reference score corresponding to the responding evidence is very high, it is equivalent to indirectly weakening the authenticity of the accusation evidence, and therefore, the authenticity reference score corresponding to the accusation evidence can be decreased. Specifically, the authenticity reference score corresponding to the accusation evidence can be decreased so the authenticity reference level corresponding to the accusation evidence is lowered.

That is, when the authenticity reference score corresponding to the responding evidence is too small, it is equivalent to indirectly enhancing the authenticity of the accusation evidence, and therefore, the authenticity reference score corresponding to the accusation evidence can be increased. Specifically, the authenticity reference score corresponding to the accusation evidence can be increased so the authenticity reference level corresponding to the accusation evidence is raised.

Figure 3:
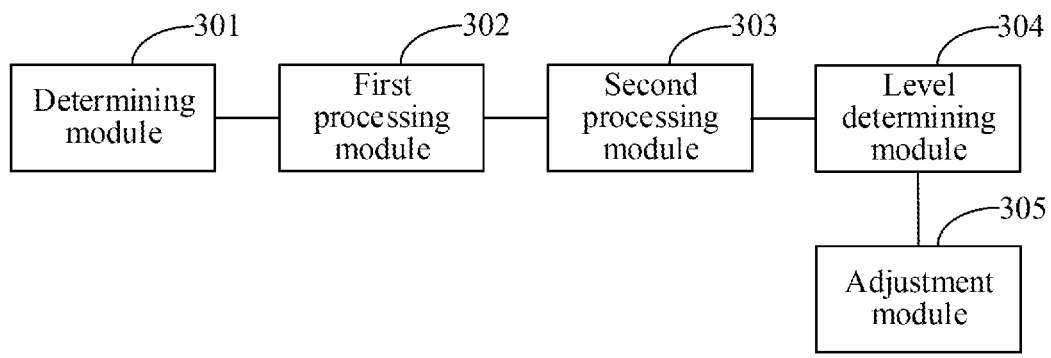
FIG. 3 is a schematic structural diagram illustrating an apparatus for determining evidence authenticity based on a blockchain ledger according to an implementation of the present specification.

In accordance to the method for identifying evidence authenticity based on a blockchain ledger shown in FIG. 1, implementations of the present specification further correspondingly provides an apparatus for identifying evidence authenticity based on a blockchain ledger. As shown in FIG. 3, the apparatus includes: a determining module 301, configured to determine whether target electronic evidence has been stored by at least one candidate blockchain ledger platform; a first processing module 302, configured to: determine a first score as an authenticity reference score corresponding to the target electronic evidence if the determining module 301 determines that the target electronic evidence has been stored by at least one candidate blockchain ledger platform; and a second processing module 303, configured to determine a second score as an authenticity reference score corresponding to the target electronic evidence if the determining module 301 determines that the target electronic evidence is not stored by at least one candidate blockchain ledger platform; where the authenticity reference score corresponding to the target electronic evidence is positively related to an authenticity degree of the identified target electronic evidence, and the first score is greater than the second score.

The determining module 301 obtains target electronic evidence uploaded by a user; calculates an evidence hash of the target electronic evidence based on the target electronic evidence; queries a candidate blockchain ledger platform based on the evidence hash to determine whether the evidence hash is included in a transaction stored by the candidate blockchain ledger platform; in response to that the evidence hash is included in the transaction stored by the candidate blockchain ledger platform, determines that the target electronic evidence has been stored by the candidate blockchain ledger platform; and in response to that the evidence hash is not included in the transaction stored by the candidate blockchain ledger platform, determines that the target electronic evidence is not stored by the candidate blockchain ledger platform.

The determining module 301 obtains a target transaction hash uploaded by a user; queries a candidate blockchain ledger platform based on the target transaction hash to determine whether there is a transaction whose transaction hash is the target transaction hash among transactions recorded by the candidate blockchain ledger platform; in response to that there is a transaction whose transaction hash is the target transaction hash among the transactions recorded by the candidate blockchain ledger platform, identifies the transaction whose transaction hash is the target transaction hash as a target transaction, determines electronic evidence stored by the target transaction as the target electronic evidence, and determines that the target electronic evidence has been stored by the candidate blockchain ledger platform; and in response to that there is no transaction whose transaction hash is the target transaction hash among the transactions recorded by the candidate blockchain ledger platform, determines that the target electronic evidence is not stored by the candidate blockchain ledger platform.

The determining module 301 obtains the target electronic evidence and a target transaction hash uploaded by a user; queries a candidate blockchain ledger platform based on the target transaction hash to determine whether there is a transaction whose transaction hash is the target transaction hash among transactions recorded by the candidate blockchain ledger platform; in response to that there is a transaction whose transaction hash is the target transaction hash among the transactions recorded by the candidate blockchain ledger platform, identifies the transaction whose transaction hash is the target transaction hash as a target transaction, determines whether electronic evidence stored by the target transaction is the same as the target electronic evidence, in response to that the electronic evidence stored by the target transaction is the same as the target electronic evidence, determines that the target electronic evidence has been stored by the candidate blockchain ledger platform, and in response to that the electronic evidence stored by the target transaction is not the same as the target electronic evidence, determines that the target electronic evidence is not stored by the candidate blockchain ledger platform; and in response to that there is no transaction whose transaction hash is the target transaction hash among the transactions recorded by the candidate blockchain ledger platform, determines that the target electronic evidence is not stored by the candidate blockchain ledger platform.

A plurality of categories are determined, and a corresponding scoring rule is configured for each category of the plurality of categories; the first processing module 302 determines a category of the plurality of categories that the target electronic evidence belongs to as a target category, and determines one of the first score or the second score based on a scoring rule as corresponding to the target category; and the second processing module 303 determines a category of the plurality of categories that the target electronic evidence belongs to as a target category, and determines the second score based on a scoring rule corresponding to the target category.

A plurality of score intervals corresponding to each category of the plurality of categories are determined, and an authenticity reference level corresponding to each score interval corresponding to the category is configured; between two score intervals of the plurality of score intervals, a score interval with a larger left endpoint value corresponds to a higher authenticity reference level.

The apparatus further includes: a level determining module 304, configured to determine, from the plurality of score intervals corresponding to the target category, a score interval into which the authenticity reference score corresponding to the target electronic evidence falls as a target score interval; and determines an authenticity reference level corresponding to the target score interval as an authenticity reference level corresponding to the target electronic evidence, the authenticity reference level corresponding to each specified electronic evidence that is obtained based on the adjusted one or more of the scoring rule and the score interval corresponding to the category being consistent with the authenticity confidence level corresponding to the specified electronic evidence.

The apparatus further includes: an adjustment module 305, configured to: for each category, obtain an authenticity confidence level corresponding to each electronic evidence belonging to the category, the authenticity confidence level corresponding to the electronic evidence being confirmed by a judicial procedure; select, among the electronic evidence belonging to the category, electronic evidence whose authenticity reference level and authenticity confidence level are inconsistent as identified electronic evidence; and in response to that a ratio between the specified electronic evidence and the electronic evidence belonging to the category is greater than a threshold ratio, adjust one or more of a scoring rule and a score interval corresponding to the category based on the authenticity confidence level corresponding to each specified electronic evidence.

The second processing module 303 determines whether the target electronic evidence is stored by a non-candidate blockchain ledger platform specified by a user; in response to that the target electronic evidence is stored by the non-candidate blockchain ledger platform specified by the user, determines a third score corresponding to the target electronic evidence as the authenticity reference score corresponding to the target electronic evidence; and in response to that the target electronic evidence is not stored by the non-candidate blockchain ledger platform specified by the user, determines a second score corresponding to the target electronic evidence as the authenticity reference score corresponding to the target electronic evidence; where the third score is greater than the second score, and the third score is less than the first score.

The second processing module 303 determines a specified score as the second score; and in response to determining that a specified condition is met, determines a score greater than the specified score as the second score; the determining that the specified condition is met specifically includes: determining, as similar electronic evidence corresponding to the target electronic evidence, the electronic evidence most similar to the target electronic evidence from electronic evidence stored by each candidate blockchain ledger platform; calculating a similarity score between the target electronic evidence and the similar electronic evidence as a similarity score corresponding to the target electronic evidence, a greater similarity score corresponding to the target electronic evidence indicating that the target electronic evidence is more similar to the similar electronic evidence; selecting a similarity score that is greatest among similarity scores corresponding to the target electronic evidence as a greatest similarity score; and in response to that the greatest similarity score is greater than a threshold similarity score, determining that the specified condition is met.

Figure 4:
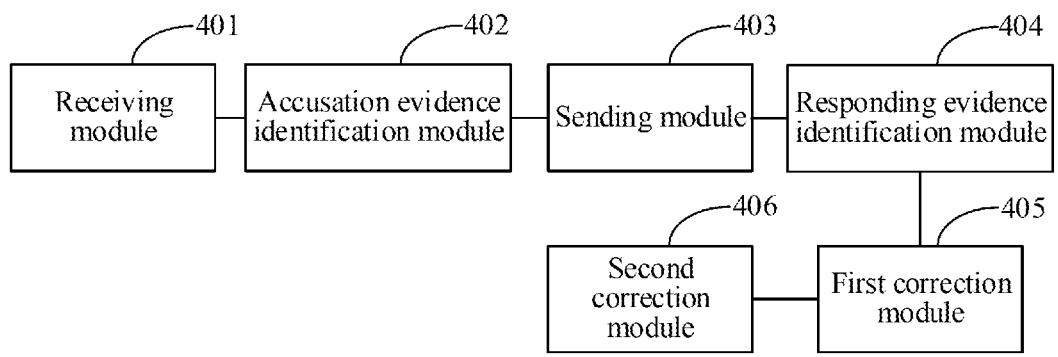
FIG. 4 is a schematic structural diagram illustrating an apparatus for determining authenticity of two parties' evidence based on a blockchain ledger according to an implementation of the present specification.

Based on the method for identifying authenticity of two parties' evidence based on a blockchain ledger shown in FIG. 2, implementations of the present specification further correspondingly provides an apparatus for identifying authenticity of two parties' evidence based on a blockchain ledger. As shown in FIG. 4, the apparatus includes: a receiving module 401, configured to receive case event information uploaded by an accusant of a case; an accusation evidence identification module 402, configured to determine an authenticity reference score corresponding to accusation evidence through a target procedure, the accusation evidence being electronic evidence presented by the accusant to support the case event information; a sending module 403, configured to send the case event information and the accusation evidence to a respondent of the case; and a responding evidence identification module 404, configured to: in response to that it is determined that there is responding evidence, determine an authenticity reference score corresponding to the responding evidence through the target procedure, the responding evidence being electronic evidence presented by the respondent to falsify the case event information.

The target procedure includes: determining whether target electronic evidence has been stored by at least one candidate blockchain ledger platform, the target electronic evidence being the accusation evidence or the responding evidence; determining a first score as an authenticity reference score corresponding to the target electronic evidence in response to that it is determined that the target electronic evidence has been stored by the at least one candidate blockchain ledger platform; or determining a second score as an authenticity reference score corresponding to the target electronic evidence in response to that it is determined that the target electronic evidence is not stored by the at least one candidate blockchain ledger platform; where the authenticity reference score corresponding to the target electronic evidence is positively related to an authenticity degree of the identified target electronic evidence, and the first score is greater than the second score.

The determining whether the target electronic evidence has been stored by the at least one candidate blockchain ledger platform specifically includes: obtaining the target electronic evidence uploaded by a user; calculating an evidence hash of the target electronic evidence based on the target electronic evidence; querying a candidate blockchain ledger platform based on the evidence hash to determine whether the evidence hash is included in a transaction stored by the candidate blockchain ledger platform; in response to that the evidence hash is included in the transaction stored by the candidate blockchain ledger platform, determining that the target electronic evidence has been stored by the candidate blockchain ledger platform; and in response to that the evidence hash is not included in the transaction stored by the candidate blockchain ledger platform, determining that the target electronic evidence is not stored by the candidate blockchain ledger platform.

The determining whether the target electronic evidence has been stored by the at least one candidate blockchain ledger platform specifically includes: obtaining a target transaction hash uploaded by a user; querying a candidate blockchain ledger platform based on the target transaction hash to determine whether there is a transaction whose transaction hash is the target transaction hash among transactions recorded by the candidate blockchain ledger platform; in response to that there is a transaction whose transaction hash is the target transaction hash among the transactions recorded by the candidate blockchain ledger platform, identifying the transaction whose transaction hash is the target transaction hash as a target transaction, determining electronic evidence stored by the target transaction as the target electronic evidence, and determining that the target electronic evidence has been stored by the candidate blockchain ledger platform; and in response to that there is no transaction whose transaction hash is the target transaction hash among the transactions recorded by the candidate blockchain ledger platform, determining that the target electronic evidence is not stored by the candidate blockchain ledger platform.

The determining whether the target electronic evidence has been stored by the at least one candidate blockchain ledger platform specifically includes: obtaining the target electronic evidence and a target transaction hash uploaded by a user; querying a candidate blockchain ledger platform based on the target transaction hash to determine whether there is a transaction whose transaction hash is the target transaction hash among transactions recorded by the candidate blockchain ledger platform; in response to that there is a transaction whose transaction hash is the target transaction hash among the transactions recorded by the candidate blockchain ledger platform, identifying the transaction whose transaction hash is the target transaction hash as a target transaction, determining whether electronic evidence stored by the target transaction is the same as the target electronic evidence, in response to that the electronic evidence stored by the target transaction is the same as the target electronic evidence, determining that the target electronic evidence has been stored by the candidate blockchain ledger platform, and in response to that the electronic evidence stored by the target transaction is not the same as the target electronic evidence, determining that the target electronic evidence is not stored by the candidate blockchain ledger platform; and in response to that there is no transaction whose transaction hash is the target transaction hash among the transactions recorded by the candidate blockchain ledger platform, determining that the target electronic evidence is not stored by the candidate blockchain ledger platform.

A plurality of categories are determined, and a corresponding scoring rule is configured for each category of the plurality of categories; the determining the first score or the second score specifically includes: determining a category of the plurality of categories that the target electronic evidence belongs to as a target category; and determining the first score or the second score based on a scoring rule corresponding to the target category.

A plurality of score intervals corresponding to each category of the plurality of categories are determined, and an authenticity reference level corresponding to each score interval corresponding to the category is configured; between two score intervals of the plurality of score intervals, a score interval with a larger left endpoint value corresponds to a higher authenticity reference level.

The target procedure further includes: determining, from the plurality of score intervals corresponding to the target category, a score interval into which the authenticity reference score corresponding to the target electronic evidence falls as a target score interval; and determining an authenticity reference level corresponding to the target score interval as an authenticity reference level corresponding to the target electronic evidence.

The target procedure further includes: for a category of the plurality of categories, obtaining an authenticity confidence level corresponding to each electronic evidence belonging to the category, the authenticity confidence level corresponding to the electronic evidence being confirmed by a judicial procedure; selecting, among the electronic evidence belonging to the category, electronic evidence whose authenticity reference level and authenticity confidence level are inconsistent as identified electronic evidence; and in response to that a ratio between the specified electronic evidence and the electronic evidence belonging to the category is greater than a threshold ratio, adjusting one or more of a scoring rule and a score interval corresponding to the category based on the authenticity confidence level corresponding to each specified electronic evidence, the authenticity reference level corresponding to each specified electronic evidence that is obtained based on the adjusted one or more of the scoring rule and the score interval corresponding to the category being consistent with the authenticity confidence level corresponding to the specified electronic evidence.

The determining the second score as the authenticity reference score corresponding to the target electronic evidence specifically includes: determining whether the target electronic evidence is stored by a non-candidate blockchain ledger platform specified by a user; in response to that the target electronic evidence is stored by the non-candidate blockchain ledger platform specified by the user, determining a third score corresponding to the target electronic evidence as the authenticity reference score corresponding to the target electronic evidence; and in response to that the target electronic evidence is not stored by the non-candidate blockchain ledger platform specified by the user, determining a second score corresponding to the target electronic evidence as the authenticity reference score corresponding to the target electronic evidence.

The third score is greater than the second score, and the third score is less than the first score.

The determining the second score specifically includes: determining a specified score as the second score; and in response to determining that a specified condition is met, determining a score greater than the specified score as the second score; and the determining that the specified condition is met specifically includes: determining, as similar electronic evidence corresponding to the target electronic evidence, the electronic evidence most similar to the target electronic evidence from electronic evidence stored by each candidate blockchain ledger platform; calculating a similarity score between the target electronic evidence and the similar electronic evidence as a similarity score corresponding to the target electronic evidence, a greater similarity score corresponding to the target electronic evidence indicating that the target electronic evidence is more similar to the similar electronic evidence; selecting a similarity score that is greatest among similarity scores corresponding to the target electronic evidence as a greatest similarity score; and in response to that the greatest similarity score is greater than a threshold similarity score, determining that the specified condition is met.

The apparatus further includes: a first correction module 405, configured to: in response to that it is determined that there is no responding evidence, increase the authenticity reference score corresponding to the accusation evidence.

The apparatus further includes: a second correction module 406, configured to: in response to that the authenticity reference score corresponding to the responding evidence meets a determined correction triggering condition, correct the authenticity reference score corresponding to the accusation evidence.

The second correction module 406 is configured to: in response to that the authenticity reference score corresponding to the responding evidence is greater than a first specified threshold score, as the determined correction triggering condition, decrease the authenticity reference score corresponding to the accusation evidence; and in response to that the authenticity reference score corresponding to the responding evidence is less than a second specified threshold score, as the determined correction triggering condition, increase the authenticity reference score corresponding to the accusation evidence, where the first specified threshold score is greater than the second specified threshold score.

Implementations of the present specification further provides a computer device. The computer device includes at least a memory, a processor, and a computer program that is stored in the memory and that can run on the processor. When executing the program, the processor implements the functions of the methods in one or more of FIG. 1 and FIG. 2.

Figure 5:
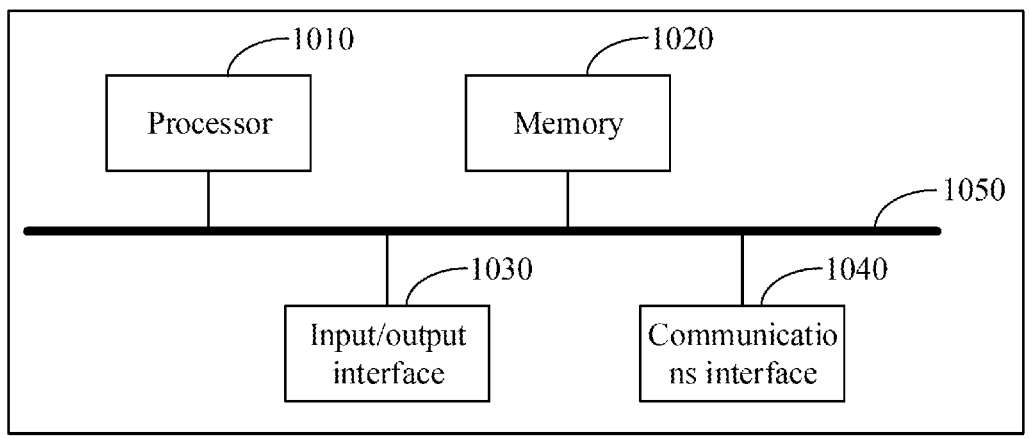
FIG. 5 is a schematic structural diagram illustrating a computer device used to configure a method in an implementation of the present specification.

FIG. 5 is a more detailed schematic diagram illustrating a hardware structure of a computing device according to implementations of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device to provide a corresponding function. The input device can include a keyboard, a mouse, a touchscreen, a microphone, various sensors, etc. The output device can include a monitor, a speaker, a vibrator, an indicator, etc.

The communications interface 1040 is configured to be connected to a communications module (not shown in the figure), to implement a communication interaction between the device and another device. The communications module can perform communication in a wired method (for example, USB or a network cable), or can perform communication in a wireless method (for example, a mobile network, Wi-Fi, or Bluetooth).

The bus 1050 includes one channel, used to transmit information between components (for example, the processor 1010, the memory 1020, the input/output interface 1030, and the communications interface 1040) of the device.

It should be noted that although only the processor 1010, the memory 1020, the input/output interface 1030, the communications interface 1040, and the bus 1050 of the device are shown, during specific implementations, the device can further include other components needed for implementing normal running. In addition, a person skilled in the art can understand that the device can include only components necessary for implementing the solutions in the implementations of the present specification, but does not necessarily include all components shown in the figure.

Implementations of the present specification further provides a computer readable storage medium. The computer readable storage medium stores a computer program. When executing the program, a processor implements the functions of the methods in one or more of FIG. 1 and FIG. 2.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EE-PROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It can be understood from the descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to execute the method described in the implementations of the present specification or in some parts of the implementations of the present specification.

The system, method, module, or unit illustrated in the previous implementations can be implemented by using a computer chip or an entity, or can be implemented by using a product having a certain function. A typical implementations device is a computer in the form of a personal computer, a laptop computer, a cellular phone, a camera phone, a smart phone, a personal digital assistant, a media player, a navigation device, an e-mail transceiver, a game console, a tablet computer, a wearable device, or any combination of at least two of these devices.

The implementations of the present specification are described in a progressive method. For same or similar parts of the implementations, references can be made to the implementations. Each implementations focuses on a difference from other implementations. Particularly, the apparatus and device implementations are similar to the method implementations, and therefore are described briefly. For related parts, references can be made to the descriptions in the method implementations. The method implementations described above is merely an example. The modules described as separate parts can or cannot be physically separate. During implementations of the solutions in the implementations of the present application, functions of the modules can be implemented in one or more pieces of software and hardware. Some or all of the modules can be selected based on an actual need to implement the solutions in the implementations. A person of ordinary skill in the art can understand and implement the implementations of the present application without creative efforts.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 6:
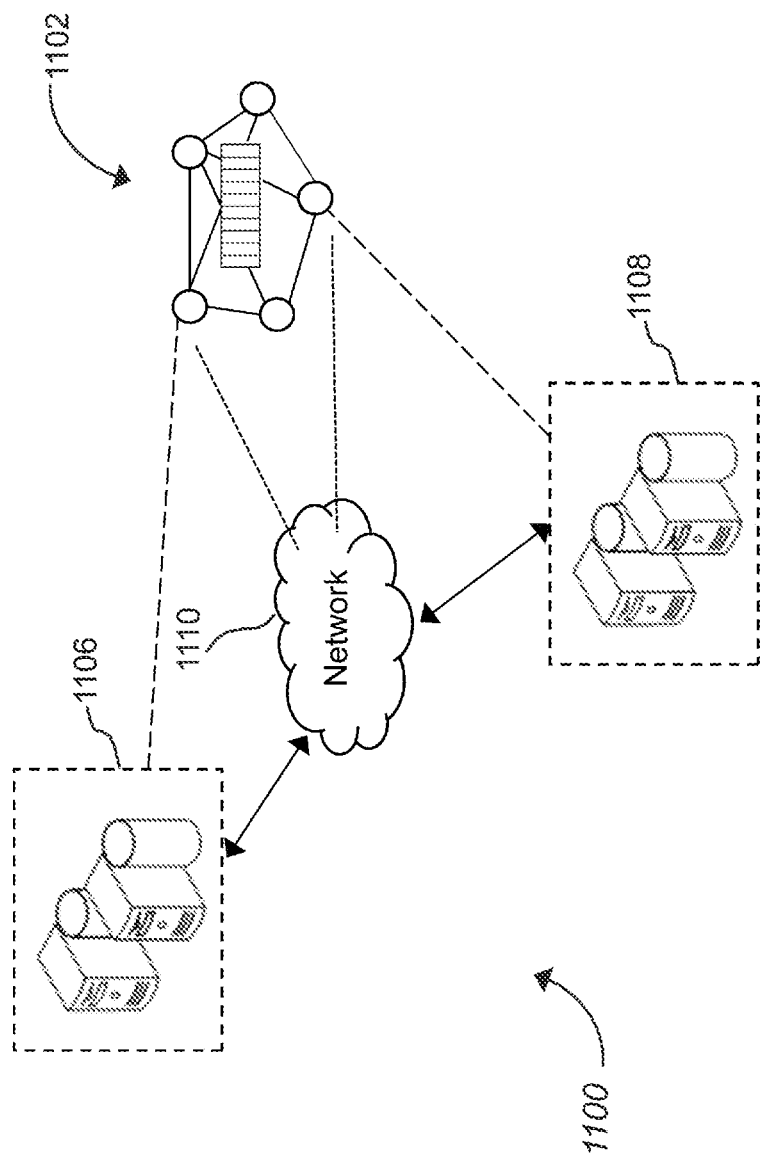
FIG. 6 is a diagram illustrating example environments that can be used to execute embodiments of this specification.

FIG. 6 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 6, the consortium blockchain network 1102 is represented as a peer-to-peer network of nodes, and the computing systems 1106, 1108 provide nodes of the first entity and second entity, respectively, which participate in the consortium blockchain network 1102.

Figure 7:
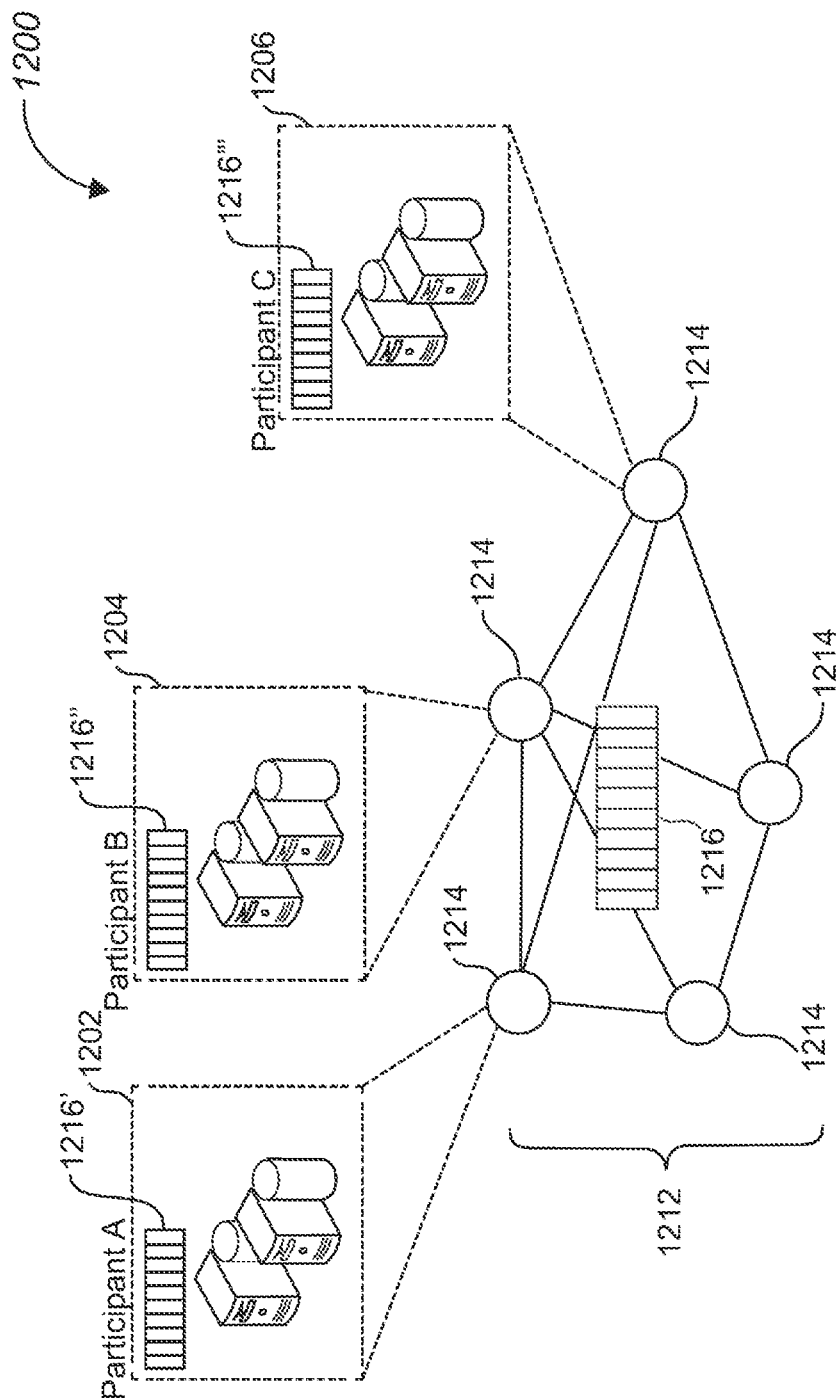
FIG. 7 is a diagram illustrating an example architecture in accordance with embodiments of this specification.

FIG. 7 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 7, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 2, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 7, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 7, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 7, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

In some embodiments, the apparatus and system of the specification can be implemented within the blockchain environment 1100 of FIG. 6 and using the blockchain architecture 1200 of FIG. 7. For example, transaction information of evidence is stored as blocks in the blockchain 1216.

The previous descriptions are merely specific implementations of the implementations of the present application. It should be noted that a person of ordinary skill in the art can further make several improvements or polishing without departing from the principles of the implementations of the present specification, and the improvements or polishing shall fall within the protection scope of the implementations of the present specification.

The previous descriptions are merely specific implementations of the implementations of the present application. It should be noted that a person of ordinary skill in the art can further make several improvements or polishing without departing from the principles of the implementations of the present specification, and the improvements or polishing shall fall within the protection scope of the implementations of the present specification.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
by a node of a blockchain network,
receiving a piece of electronic evidence from a party of a legal action as target electronic evidence;
calculating a target evidence hash of the target electronic evidence based on the target electronic evidence using a same calculation approach as hashing a transaction into a blockchain of a candidate blockchain ledger platform of at least one candidate blockchain ledger platform;
querying the candidate blockchain ledger platform of the at least one candidate blockchain ledger platform using the target evidence hash to determine whether the target electronic evidence has been stored by the candidate blockchain ledger platform as an evidence hash that matches the target evidence hash;
determining a first score as an authenticity reference score corresponding to the target electronic evidence based on a scoring rule and in response to that it is determined that the target electronic evidence has been stored by the at least one candidate blockchain ledger platform as an evidence hash, the scoring rule including a plurality of score intervals each corresponding to an authenticity reference level, the first score belonging to a first score interval of the plurality of score intervals;
determining a second score as the authenticity reference score corresponding to the target electronic evidence based on the scoring rule and in response to that it is determined that the target electronic evidence is not stored as an evidence hash by the at least one candidate blockchain ledger platform, the second score belonging to a second score interval of the plurality of score intervals, the first score being greater than the second score;
in response to that it is determined that the target electronic evidence is not stored as an evidence hash by the at least one candidate blockchain ledger platform and that a similarity score between the target electronic evidence and an electronic evidence stored in the at least one candidate blockchain ledger platform meets a threshold similarity score, determining a third score as the authenticity reference score corresponding to the target electronic evidence, the third score higher than the second score and lower than the first score;
adopting the target electronic evidence in the legal action based on the authenticity reference score of the target electronic evidence; and
adjusting one or more of the scoring rule or the plurality of score intervals of the scoring rule based on an authenticity confidence level of the target electronic evidence determined in a judicial procedure of the legal action.

2. The method according to claim 1, wherein the querying the candidate blockchain ledger platform using the target evidence hash includes:
querying a candidate blockchain ledger platform based on the target evidence hash to determine whether the target evidence hash is included in a transaction stored by the candidate blockchain ledger platform;
in response to that the target evidence hash is included in the transaction stored by the candidate blockchain ledger platform, determining that the target electronic evidence has been stored by the candidate blockchain ledger platform; and
in response to that the evidence hash is not included in the transaction stored by the candidate blockchain ledger platform, determining that the target electronic evidence is not stored by the candidate blockchain ledger platform.

3. The method according to claim 1, further comprising:
obtaining a target transaction hash uploaded by a user;
querying a candidate blockchain ledger platform of the at least one candidate blockchain ledger platform based on the target transaction hash to determine, among transactions recorded by the candidate blockchain ledger platform, whether there is a transaction whose transaction hash is a same as the target transaction hash;
in response to that there is a transaction whose transaction hash is the same as the target transaction hash among the transactions recorded by the candidate blockchain ledger platform, determining electronic evidence stored by the transaction as target electronic evidence.

4. The method according to claim 1, further comprising:
obtaining a target transaction hash uploaded by a user;
querying a candidate blockchain ledger platform of the at least one candidate blockchain ledger platform based on the target transaction hash to determine, among transactions recorded by the candidate blockchain ledger platform, whether there is a transaction whose transaction hash is a same as the target transaction hash; and
in response to that there is a transaction whose transaction hash is the same as the target transaction hash among transactions recorded by the candidate blockchain ledger platform:
determining whether electronic evidence stored by the transaction is the same as the target electronic evidence; and in response to that the electronic evidence stored by the target transaction is the same as the target electronic evidence, determining that the target electronic evidence has been stored by the candidate blockchain ledger platform.

5. The method according to claim 1, comprising:
determining, from the plurality of score intervals, a score interval into which the authenticity reference score corresponding to the target electronic evidence belongs to as a target score interval; and
determining an authenticity reference level corresponding to the target score interval as an authenticity reference level corresponding to the target electronic evidence.

6. The method according to claim 5, further comprising:
obtaining an authenticity confidence level corresponding to each piece of electronic evidence of a plurality of pieces of electronic evidence, the authenticity confidence level corresponding to the piece of electronic evidence being confirmed by a judicial procedure;
selecting, among the plurality of pieces of electronic evidence, a piece of electronic evidence whose authenticity reference level and authenticity confidence level are inconsistent as a piece of identified electronic evidence; and
in response to a ratio between an amount of pieces of the identified electronic evidence and an amount of the plurality of pieces of electronic evidence is greater than a threshold ratio, adjusting one or more of the scoring rule and a score interval of the scoring rule based on the authenticity confidence level corresponding to each identified electronic evidence.

7. The method according to claim 1, wherein the determining the second score as the authenticity reference score corresponding to the target electronic evidence specifically includes:
determining whether the target electronic evidence is stored by a non-candidate blockchain ledger platform specified by a user;
in response to that the target electronic evidence is stored by the non-candidate blockchain ledger platform specified by the user, determining a third score corresponding to the target electronic evidence as the authenticity reference score corresponding to the target electronic evidence, the third score being greater than the second score and less than the first score; and
in response to the target electronic evidence is not stored by the non-candidate blockchain ledger platform specified by the user, determining the second score as the authenticity reference score corresponding to the target electronic evidence.

8. The method according to claim 1, wherein the determining the third score as the authenticity reference score corresponding to the target electronic evidence includes:
determining electronic evidence most similar to the target electronic evidence among electronic evidence stored by a candidate blockchain ledger platform as similar electronic evidence corresponding to the target electronic evidence;
calculating a similarity score between the target electronic evidence and the similar electronic evidence as a similarity score corresponding to the target electronic evidence;
selecting a similarity score that is greatest among similarity scores corresponding to the target electronic evidence as a greatest similarity score;
in response to that the greatest similarity score does not meet a threshold similarity score, assigning a first score value as the second score; and
in response to that the greatest similarity score meets the threshold similarity score, determining a second score value as the third score, the second score value greater than the first score value.

9. A non-transitory storage medium that stores computer-executable instructions, which when executed by a processor enable the processor to implement acts comprising:
receiving a piece of electronic evidence from a party of a legal action as target electronic evidence;
calculating a target evidence hash of the target electronic evidence based on the target electronic evidence using a same calculation approach as hashing a transaction into a blockchain of a candidate blockchain ledger platform of at least one candidate blockchain ledger platform;
querying the candidate blockchain ledger platform of the at least one candidate blockchain ledger platform using the target evidence hash to determine whether the target electronic evidence has been stored by the candidate blockchain ledger platform as an evidence hash that matches the target evidence hash;
determining a first score as an authenticity reference score corresponding to the target electronic evidence based on a scoring rule and in response to that the determining module determines that the target electronic evidence is stored by the at least one candidate blockchain ledger platform as an evidence hash, the scoring rule including a plurality of score intervals each corresponding to an authenticity reference level, the first score belonging to a first score interval of the plurality of score intervals;
determining a second score as the authenticity reference score corresponding to the target electronic evidence based on the scoring rule and in response to that it is determined that the target electronic evidence is not stored as an evidence hash by the at least one candidate blockchain ledger platform, the second score belonging to a second score interval of the plurality of score intervals, the first score being greater than the second score;
in response to that it is determined that the target electronic evidence is not stored as an evidence hash by the at least one candidate blockchain ledger platform and that a similarity score between the target electronic evidence and an electronic evidence stored in the at least one candidate blockchain ledger platform meets a threshold similarity score, determining a third score as the authenticity reference score corresponding to the target electronic evidence, the third score higher than the second score and lower than the first score;
adopting the target electronic evidence in the legal action based on the authenticity reference score of the target electronic evidence; and
adjusting one or more of the scoring rule or the plurality of score intervals of the scoring rule based on an authenticity confidence level of the target electronic evidence determined in a judicial procedure of the legal action.

10. The non-transitory storage medium according to claim 9, wherein the querying the candidate blockchain ledger platform using the target evidence hash includes:
querying a candidate blockchain ledger platform based on the target evidence hash to determine whether the target evidence hash is included in a transaction stored by the candidate blockchain ledger platform;

in response to that the target evidence hash is included in the transaction stored by the candidate blockchain ledger platform, determining that the target electronic evidence has been stored by the candidate blockchain ledger platform; and in response to that the evidence hash is not included in the transaction stored by the candidate blockchain ledger platform, determining that the target electronic evidence is not stored by the candidate blockchain ledger platform.

11. The non-transitory storage medium according to claim 9, wherein the acts further comprise:
obtaining a target transaction hash uploaded by a user;
querying a candidate blockchain ledger platform of the at least one candidate blockchain ledger platform based on the target transaction hash to determine, among transactions recorded by the candidate blockchain ledger platform, whether there is a transaction whose transaction hash is a same as the target transaction hash;
in response to that there is a transaction whose transaction hash is the same as the target transaction hash among the transactions recorded by the candidate blockchain ledger platform:
determining electronic evidence stored by the target transaction as target electronic evidence.

12. The non-transitory storage medium according to claim 9, wherein the acts further comprises:
obtaining a target transaction hash uploaded by a user;
querying a candidate blockchain ledger platform of the at least one candidate blockchain ledger platform based on the target transaction hash to determine, among transactions recorded by the candidate blockchain ledger platform, whether there is a transaction whose transaction hash is a same as the target transaction hash; and
in response to that there is a transaction whose transaction hash is the same as the target transaction hash among the transactions recorded by the candidate blockchain ledger platform:
determining whether electronic evidence stored by the target transaction is the same as the target electronic evidence; and
in response to that the electronic evidence stored by the target transaction is the same as the electronic evidence, determining that the target electronic evidence has been stored by the candidate blockchain ledger platform.

13. The non-transitory storage medium according to claim 9, wherein the acts further comprise:
determining the score interval that the authenticity reference score corresponding to the target electronic evidence belongs to as a target score interval; and
determining an authenticity reference level corresponding to the target score interval as an authenticity reference level corresponding to the target electronic evidence.

14. The non-transitory storage medium according to claim 13, wherein the acts further comprise:
obtaining an authenticity confidence level corresponding to each piece of electronic evidence of a plurality of pieces of electronic evidence, the authenticity confidence level corresponding to the piece of electronic evidence being confirmed by a judicial procedure;
selecting, among the plurality of pieces of electronic evidence, a piece of electronic evidence whose authenticity reference level and authenticity confidence level are inconsistent as a piece of identified electronic evidence; and in response to that a ratio between an amount of pieces of the identified electronic evidence and an amount of the plurality of pieces of the electronic evidence is greater than a threshold ratio, adjusting one or more of the scoring rule and a score interval of the scoring rule based on the authenticity confidence level corresponding to each identified electronic evidence.

15. The non-transitory storage medium according to claim 9, wherein the determining the second score as the authenticity reference score corresponding to the target electronic evidence comprises:
determining whether the target electronic evidence is stored by a non-candidate blockchain ledger platform specified by a user;
in response to that the target electronic evidence is stored by the non-candidate blockchain ledger platform specified by the user, determining a third score corresponding to the target electronic evidence as the authenticity reference score corresponding to the target electronic evidence; and
in response to the target electronic evidence is not stored by the non-candidate blockchain ledger platform specified by the user, determining the second score as the authenticity reference score corresponding to the target electronic evidence, the third score being greater than the second score and less than the first score.

16. The non-transitory storage medium according to claim 9, wherein the determining the third score as the authenticity reference score corresponding to the target electronic evidence comprises:
determining electronic evidence most similar to the target electronic evidence among electronic evidence stored by a candidate blockchain ledger platform as similar electronic evidence corresponding to the target electronic evidence;
calculating a similarity score between the target electronic evidence and the similar electronic evidence as a similarity score corresponding to the target electronic evidence;
selecting a similarity score that is greatest among similarity scores corresponding to the target electronic evidence as a greatest similarity score;
in response to that the greatest similarity score does not meet a threshold similarity score, determining a first score value as the second score; and
in response to that the greatest similarity score meets the threshold similarity score, determining a second score value as the third score, the second score value greater than the first score value.

17. A computer device, comprising a memory, a processor, and a computer program that is stored in the memory, the computer program including executable instructions that, when executed by the processor, configure the processor to implement acts including:
receiving a piece of electronic evidence from a party of a legal action as target electronic evidence;
calculating a target evidence hash of the target electronic evidence based on the target electronic evidence using a same calculation approach as hashing a transaction into a blockchain of a candidate blockchain ledger platform of at least one candidate blockchain ledger platform;
querying the candidate blockchain ledger platform of the at least one candidate blockchain ledger platform using the target evidence hash to determine whether the target electronic evidence has been stored by the candidate blockchain ledger platform as an evidence hash that matches the target evidence hash;

determining a first score as an authenticity reference score corresponding to the target electronic evidence based on a scoring rule and in response to that it is determined that the target electronic evidence has been stored by the at least one candidate blockchain ledger platform as an evidence hash, the scoring rule including a plurality of score intervals each corresponding to an authenticity reference level, the first score belonging to a first score interval of the plurality of score intervals;

determining a second score as the authenticity reference score corresponding to the target electronic evidence based on the scoring rule and in response to that it is determined that the target electronic evidence is not stored as an evidence hash by the at least one candidate blockchain ledger platform, the second score belonging to a second score interval of the plurality of score intervals, the first score being greater than the second score;

in response to that it is determined that the target electronic evidence is not stored as an evidence hash by the at least one candidate blockchain ledger platform and that a similarity score between the target electronic evidence and an electronic evidence stored in the at least one candidate blockchain ledger platform meets a threshold similarity score, determining a third score as the authenticity reference score corresponding to the target electronic evidence, the third score higher than the second score and lower than the first score;

adopting the target electronic evidence in the legal action based on the authenticity reference score of the target electronic evidence; and adjusting one or more of the scoring rule or the plurality of score intervals of the scoring rule based on an authenticity confidence level of the target electronic evidence determined in a judicial procedure of the legal action.

18. The computer device according to claim 17, wherein the querying the candidate blockchain ledger platform using the target evidence hash includes determining whether the target evidence hash is included in a transaction stored by the candidate blockchain ledger platform.

19. The computer device according to claim 17, wherein the determining the second score as the authenticity reference score corresponding to the target electronic evidence specifically includes:

determining whether the target electronic evidence is stored by a non-candidate blockchain ledger platform specified by a user;

in response to that the target electronic evidence is stored by the non-candidate blockchain ledger platform specified by the user, determining a third score corresponding to the target electronic evidence as the authenticity reference score corresponding to the target electronic evidence, the third score being greater than the second score and less than the first score; and in response to the target electronic evidence is not stored by the non-candidate blockchain ledger platform specified by the user, determining the second score as the authenticity reference score corresponding to the target electronic evidence.

20. The computer device according to claim 17, wherein the determining the third score as the authenticity reference score corresponding to the target electronic evidence includes:

determining electronic evidence most similar to the target electronic evidence among electronic evidence stored by a candidate blockchain ledger platform as similar electronic evidence corresponding to the target electronic evidence;

calculating a similarity score between the target electronic evidence and the similar electronic evidence as a similarity score corresponding to the target electronic evidence;

selecting a similarity score that is greatest among similarity scores corresponding to the target electronic evidence as a greatest similarity score;

in response to that the greatest similarity score does not meet a threshold similarity score, assigning a first score value as the second score; and in response to that the greatest similarity score meets the threshold similarity score, determining a second score value as the third score, the second score value greater than the first score value.

* * * * *